(12) United States Patent
Potyrailo

(10) Patent No.: US 6,499,355 B1
(45) Date of Patent: Dec. 31, 2002

(54) ELONGATION AND CRACKING TESTING AND OPTICAL CHARACTERIZATION OF SMALL-SIZE COATINGS AND MATERIALS

(75) Inventor: Radislav Alexandrovich Potyrailo, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/682,359

(22) Filed: Aug. 24, 2001

(51) Int. Cl.[7] .................................................. G01B 11/16
(52) U.S. Cl. ........................... 73/762; 73/800; 73/150 A
(58) Field of Search ........................... 73/762, 826, 768, 73/767, 794, 800, 150 R, 150 A

(56) References Cited

U.S. PATENT DOCUMENTS

| | | |
|---|---|---|
| 4,031,746 A | 6/1977 | Furuta et al. |
| 4,241,801 A | 12/1980 | Kushmuk |
| 4,413,510 A * | 11/1983 | McCusker et al. ............. 73/150 |
| 5,015,950 A * | 5/1991 | Rose et al. .................. 324/224 |
| 5,193,398 A | 3/1993 | Harder et al. |
| 5,199,305 A * | 4/1993 | Smith et al. ................... 73/851 |
| 5,568,259 A | 10/1996 | Kamegawa |
| 5,763,789 A | 6/1998 | Ettemeyer |

OTHER PUBLICATIONS

ASTM D 522–93a, Standard Test Methods for Mandarel Bend Test of AttachedOrganic Coatings; ASTM: 1993.

* cited by examiner

Primary Examiner—Max Noori
(74) Attorney, Agent, or Firm—Noreen C. Johnson; Christian G. Cabou

(57) ABSTRACT

This invention relates to methods for testing elongation and cracking of coating arrays. The method includes simultaneously applying an elongating force to each of a plurality of coatings, and monitoring the cracks and thickness decrease in each coating. A relative performance characteristic of each coating is then determined based on a correlation between a detected crack and/or thickness decrease in the coating, and the corresponding elongating force.

81 Claims, 6 Drawing Sheets

ELONGATION AND CRACKING TESTING AND OPTICAL CHARACTERIZATION OF SMALL-SIZE COATINGS AND MATERIALS

FEDERAL RESEARCH STATEMENT

The U.S. Government may have certain rights in this invention pursuant to NIST contract number 70NANB9H3038.

BACKGROUND OF INVENTION

This invention relates to a method for determining mechanical properties of coating arrays. More particularly, the invention allows for the characterization of elongation and cracking of small-size coatings arranged in an array format.

Elongation properties of a coating material are of importance for automotive, telecommunication, and other applications. Conventional methods of elongation measurements involve the use of a large size coating material of about 100 mm in width and 150 mm in length, application of a conical mandrel test apparatus followed by a visual inspection of crack formation and measurement of the distance from the farthest end of the crack to the small end of the mandrel. The disadvantages of this standard method are the need to use a large coating area to obtain measurable parameters, manual measurements, difficulties in evaluation of several coatings simultaneously, and low sensitivity of measurements. A variety of test methods for elongation have been reported. These include the use of a CCD camera to measure the distance between the grid lines and calculate the elongation, automatic tensile test devices, devices to measure elongation due to bending under load, the use of lasers for noncontact elongation measurements and for the enlargement of the measuring range of speckle measuring systems of elongation.

Unfortunately, these techniques do not provide the capabilities for measurements of a large number of small-size coatings. What is needed are devices and methods for determining a variety of mechanical properties of multiple coating arrays. Such applications are of interest in combinatorial development of coating formulations and coatings.

SUMMARY OF INVENTION

The present invention solves the above-described problems by providing methods for testing elongation and cracking of coating arrays. In one embodiment, the method comprises simultaneously applying an elongating force to each of a plurality of coatings, and monitoring for a decrease in coating thickness and/or for cracks in each of the coatings. A relative performance characteristic of each coating is then determined based on a correlation between a measured decrease in coating thickness and/or a detected crack, and the corresponding force.

In another embodiment, the method comprises applying a plurality of coatings to a plurality of substrates wherein each coating is applied to a different substrate. The substrates are secured in a test arrangement and a force is applied to the substrates in order to bend the coating on each substrate. A detection system is then used to visualize cracks in the coatings and/or any decrease in coating thickness.

In still another embodiment of the present invention, the substrates are made of a deformable material. The substrates are preferably in the form of a geometrical shape having a curved surface. The force applied to the substrates modifies the shape of each substrate, thereby causing the coating on the substrate to bend and produce cracks. A detection system is used to visualize the cracks in the coatings and/or a decrease in coating thickness.

A further embodiment comprises applying at least one coating to a substrate, and forming the substrate into at least one coil having a specific diameter. A detection system is then used to visualize any cracks in the coating and/or a decrease in coating thickness.

Further aspects and advantages of the present invention will be more clearly apparent to those skilled in the art during the course of the following description, references being made to the accompanying drawings which illustrate some preferred forms of the present invention and wherein like characters of reference designate like parts throughout the drawings.

DETAILED DESCRIPTION

Figure 1:
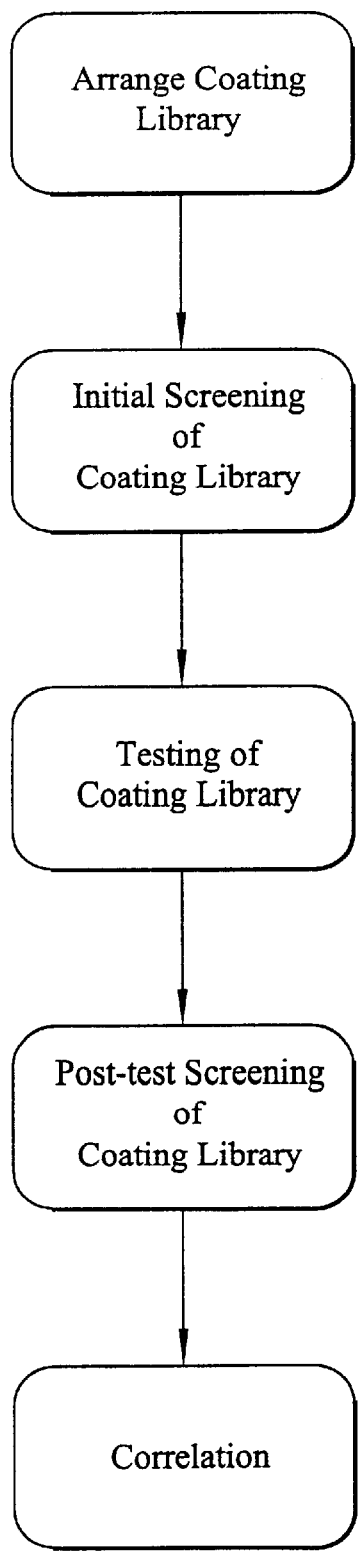
FIG. 1 is a block diagram illustrating the methodology of the present invention.

For the purposes of promoting an understanding of the principles of the invention, reference will now be made to some of the preferred embodiments of the present invention as illustrated in FIGS. 1 through 13. FIG. 1 illustrates the methodology of the present invention. First, a plurality of coatings to be analyzed is arranged in a test arrangement. The plurality of coatings may comprise the same composition or a portion of the coatings may have different compositions. Depending upon the test to be performed, the coatings may be prescreened to determine whether there are any cracks or defects present in the coatings. In addition, a pre-test measurement of coating condition may be taken for each coating during the prescreening process. The coatings are then tested, which includes simultaneously applying an elongating force to each coating. The testing step may be performed under different test conditions wherein factors such as temperature, time, salt spray, electromagnetic radiation including x-rays, ionizing radiation, ultraviolet light, etc., and atmospheric conditions such as moisture content, partial pressure of different gases, and the composition of gas or liquid in contact with the coatings are varied. Post-test screening of each coating is conducted to determine elongation measurements for each coating and to analyze crack formation in the coatings. Finally, the post-test data is compared with the prescreening information to determine the relative performance characteristic of each of the coatings based on a correlation between a detected crack in the coating and the corresponding elongating force. Preferably, the coatings are also screened during the test. In addition, it is desirable that the screening of the coatings be conducted in real-time.

The term "elongation" as used in the present application means elongation in three dimensions caused by bending or forming (e.g. thermoforming or vacuum forming).

Figure 2:
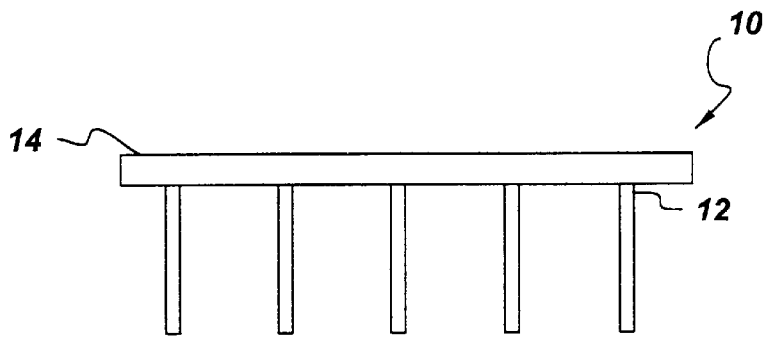
FIGS. 2–6 are side views of an embodiment of the present invention.
Figure 3:
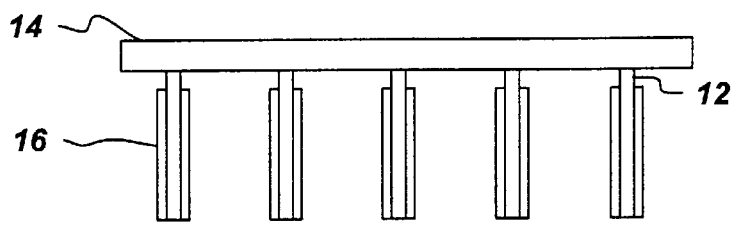

FIGS. 2–6 illustrate one embodiment of the present invention. As shown in FIG. 2, a system 10 for testing coatings comprises an array of substrates 12 secured in a test arrangement. The substrates 12 may be any shape, including but not limited to a substantially flat shape. The substrates 12 typically comprise poly(ethylene) terepthalate, polycarbonate, polyacrylate, polyvinylchloride, nylon, poly (butylenes terepthalate), polypropylene, polyethylene or blends thereof. Preferably, the substrates 12 comprise polycarbonate. A plurality of coatings 16 are applied to the plurality of substrates 12. Each coating 16 may have a distinct composition and be applied to a different substrate 12. Alternatively, coatings 16 comprising the same composition may be applied to the plurality of substrates 12. In addition, coatings 16 comprising a gradient in composition, thickness or other parameter, may be applied to the plurality of substrates 12. If necessary, the coatings 16 are cured after they are deposited onto the substrates 12, using any curing method known in the art.

Any coating 16 known in the art may be utilized in the methods of the present invention. Suitable examples of inorganic coatings include metals, alloys, ceramics, sol-gels, oxides, nitrides, and sulfides. Suitable examples of organic coatings include polymeric, oligomeric and small molecules, where small molecules are individual monomers that react to form a coating. The polymeric coating materials include, but are not limited to, polycarbonates, acrylics, silicones, cellulose esters, polyesters, alkyds, polyurethanes, and vinyl polymers and the like. Preferably, the plurality of organic coating materials include organic polymeric materials, such as "architectural" materials derived from organic materials having protective or decorative functionality, especially including thermoplastic or thermosetting polymers. Preferably, the plurality of inorganic coating materials includes oxides, nitrides and oxinitrides of silicon, aluminum, zinc and boron. Additional examples of suitable coatings include polyvinyl alcohol, ethylene vinyl alcohol copolymers, polyvinyl dichloride, nylon, acrylic, melamine, urethane, polyester, polyether, silicone, cellophane, sol-gel, polyethylene terephtalate (PET), polyvinylchloride (PVC), polychlorotrifluoroethylene (PCTFE), polypropylene, latexes, aminoplast resins, polyurethanes, epoxies, phenolic resins, acrylic resins, polyester resins, alkyd resins, halogenated polymers, cellulose derivative polymers, unsaturated polyester resins, (meth)acrylated oligomers, organic silicon derivative polymers, or combinations thereof. A particular use of this invention is for the evaluation of new types of coatings developed using combinatorial chemistry methods.

The coating 16 may include a single layer or multiple layers. In general, the coating 16 has a lateral measure, i.e. a measured length across the surface of the substrate 12, much greater than thickness, i.e. a measure of the coating normal to the surface of the substrate. The coating 16 thickness on the substrate 12 is sufficient to allow for bending of the coating without cracking the substrate 12. The coating 16 thickness is typically about 0.0001 micrometer to about 2,000 micrometers. Preferably, the coating thickness is from about 0.001 micrometer to about 1000 micrometers, and more preferably from about 0.01 micrometer to about 500 micrometers.

The coating 16 may be deposited onto the substrate 12 using a variety of methods including, but not limited to the use of a spray nozzle or gun of any type, such as ultrasonic, air, thermal, and airless guns including those using hydraulic force; microwave or radio frequency ("RF") delivery mechanisms; an ink jet print head; a vapor deposition device, including sputtering, thermal/electron/laser evaporation, chemical vapor deposition (CVD), molecular beam epitaxy, plasma spray, ion beam deposition, spincasting, dipping, and other methods.

The size of each coating sample 16 on the substrate 12 may range from about 0.001 $cm^2$ to about 100 $cm^2$. Preferably, the size of each coating sample is from about 0.01 $cm^2$ to about 10 $cm^2$, and more preferably from about 0.1 $cm^2$ to about 1 $cm^2$.

Figure 4:
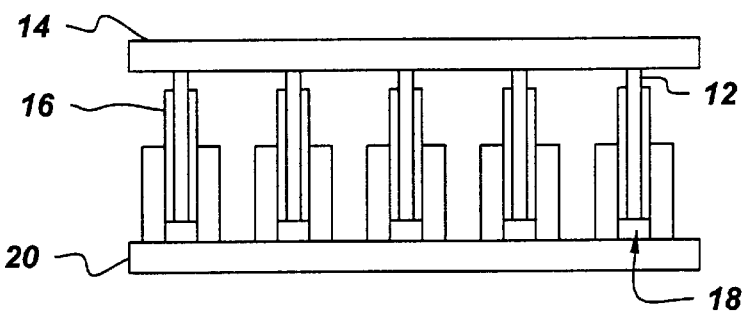
Figure 5:
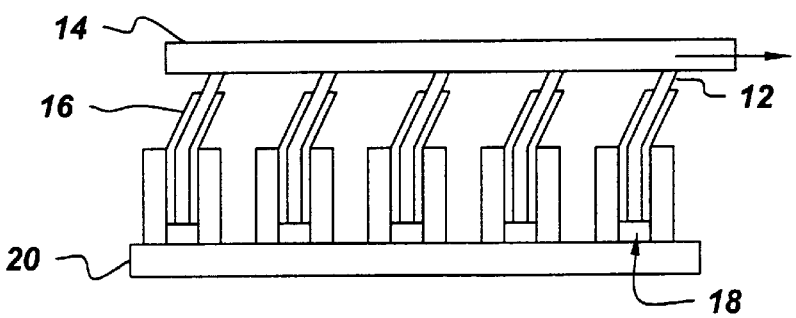
Figure 6:
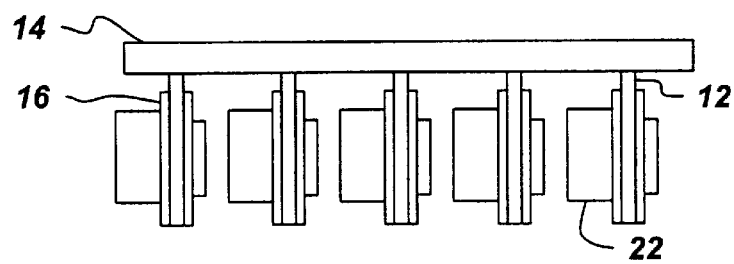

The substrates 12 are secured in such a manner that a force may be applied to the substrates in order to bend the substrates and elongate or crack the plurality of coatings 16. The force may be applied by relatively translating opposing ends of each of the plurality of coatings 16 in opposite directions. In addition, one of the opposing ends of each coating 16 may be immobilized. For example, as shown in FIG. 4 one end of each substrate 12 may be secured to a first base 14 and the opposite end of each substrate may be secured within a slot 18 located on a second base 20. A force in then applied to the plurality of substrates 12 by moving the first base 14 in a lateral direction, thereby bending the substrates and the coatings 16 located on each substrate.

A detection system 22 is used to visualize any cracks formed in the coatings 16 before, during, and after the coatings are bent. The detection system 22 may produce a single value from each coating 16, or an image of each coating surface may be obtained for manual evaluation or automatic evaluation. A plurality of detection systems 22 may be used to visualize cracks in the coatings, or a single detection system may be used to screen all of the coatings. For example, the substrates may be arranged so that a single detection system 22 can serially screen each of the coatings 16. The detection system 22 may also be used to prescreen the coatings 16 prior to any testing to determine if the coatings contain any defects or cracks. In addition, a pre-test elongation measurement may be taken of each coating during the prescreening process.

Figure 7:
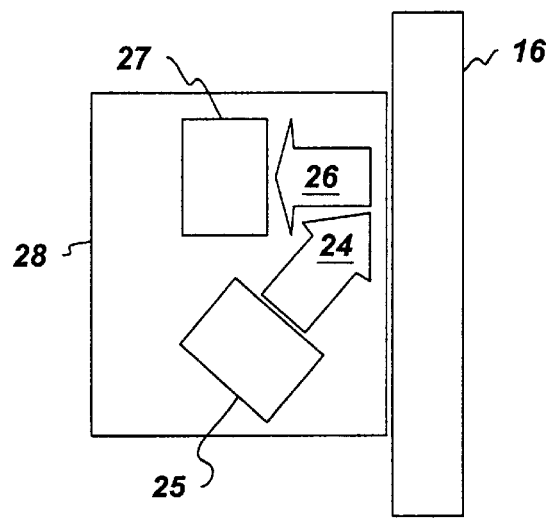
FIG. 7 is an enlarged view of a detection system of the present invention.

Any detection system known in the art may be used in the methods of the present invention. For example, as illustrated in FIG. 7, the detection system may comprise directing excitation light 24 from a light source 25 toward each coating 16. Scattered light 26 or luminescent light 26, such as fluorescent light, from any cracks in the coating 16 is then directed toward a detector 27, which is preferably an imaging detector comprising an optional optical filter. All of the components of the detection system 22 may be housed in a detector housing 28.

Figure 8:
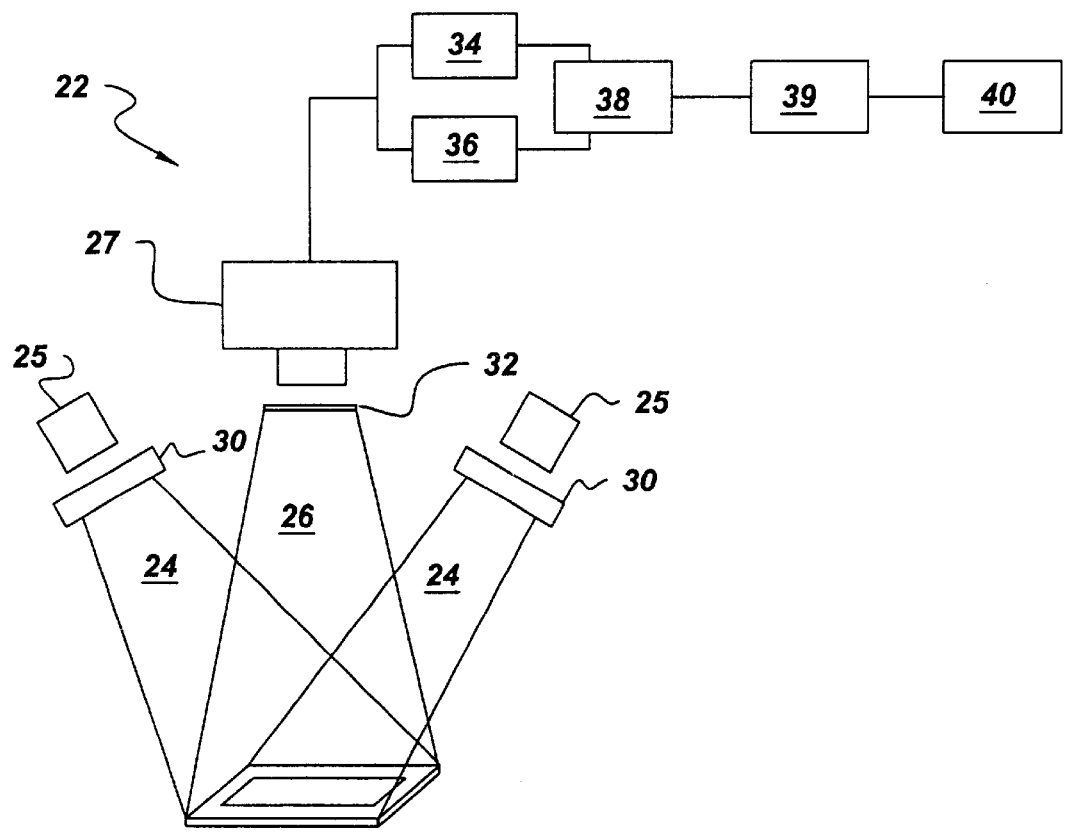
FIG. 8 is a schematic diagram of a detection system of the present invention.
Figure 9:
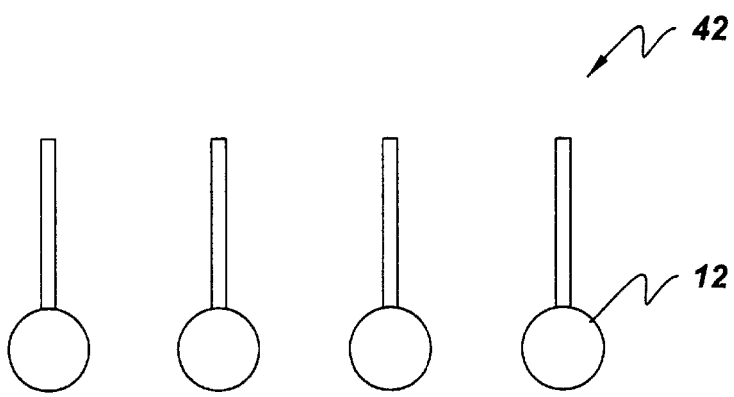
FIGS. 9–12 are side views of an alternative embodiment of the present invention.
Figure 10:
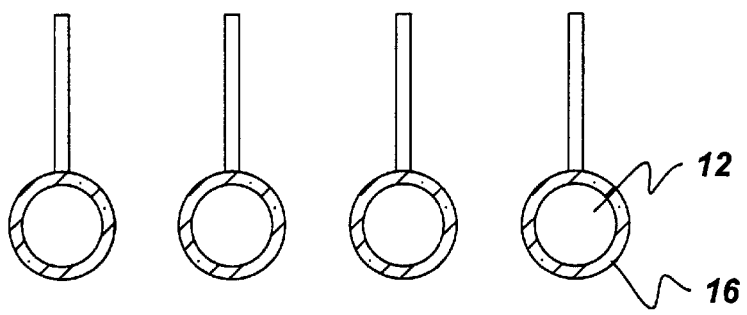
Figure 11:
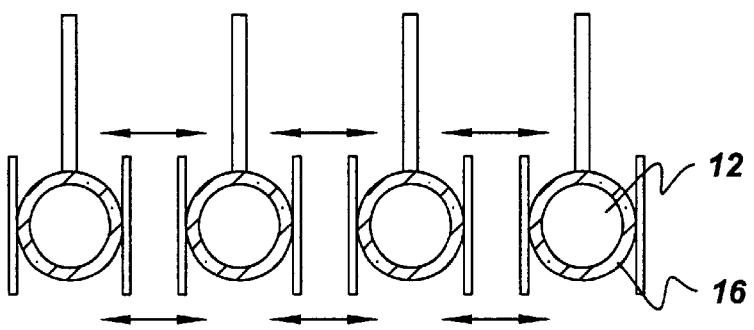
Figure 12:
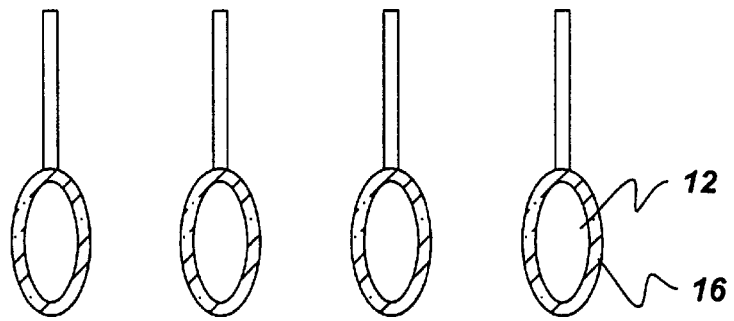

A more detailed illustration of a detection system 22 is shown in FIG. 8. A coating 16 located on a substrate 12 is irradiated with a light source 25 via an excitation wavelength selection element 30. The excitation radiation 24 is selected as desired based on whether scattered light or luminescent light will be detected from the coating 16. The scattered light 26 or luminescent emission light 26 passes through an emission wavelength selection element 32 and a detector 27, preferably an imaging detector. Pre-test screening data is collected at initial screen 34 and post-test data is collected at intermediate screen 36. Mathematical image processing is performed 38, a structural defects distribution map 39 is obtained, and the coating defects and/or decrease in coating thickness are identified 40.

If luminescent light 26 is to be detected from the coatings 16 as opposed to scattered light 26, the substrates 12 with deposited coatings 16 are dipped in a luminophore solution. When light is directed toward the coatings 16, luminescent light is emitted from any luminophore trapped in cracks in the coatings. The luminophore solution may be formed from any luminophore which is dissolvable in a suitable solvent. A suitable solvent is one which does not chemically react with the coatings 16 being tested.

Alternatively, a luminophore (fluorescent or phosphorescent dye) or calorimetric dye is embedded into the coating material. Preferably, the incorporated dye does not noticeably change the properties of interest of the coatings and does not noticeably change its optical characteristics upon the change of the environmental conditions (e.g. temperature) during the testing of the coatings. Upon testing of the coating applied onto the substrate, if cracks are formed in the coating due to the elongation of the coating, these changes are visualized using fluorescence, transmitted, and/or reflected light measurements. Also, upon testing of the coating applied onto the substrate, if the coating thickness decreases due to the elongation of the coating, this change is visualized using fluorescence, transmitted, and/or reflected light measurements by relating the amount of collected light and the coating thickness.

The following is a partial list of commercially available, suitable dyes.

5-Amino-9-diethyliminobenzo(a)phenoxazonium Perchlorate; 7-Amino-4-methylcarbostyryl; 7-Amino-4-methylcoumarin; 7-Amino-4-trifluoromethylcoumarin; 3-(2'-Benzimidazolyl)-7-N,N-diethylaminocoumarin; 3-(2'-Benzothiazolyl)-7-diethylaminocoumarin; 2-(4-Biphenylyl)-5-(4-t-butylphenyl)-1,3,4-oxadiazole; 2-(4-Biphenylyl)-5-phenyl-1,3,4-oxadiazole; 2-(4-Biphenyl)-6-phenylbenzoxazole-1,3; 2,5-Bis-(4-biphenylyl)-1,3,4-oxadiazole; 2,5-Bis-(4-biphenylyl)-oxazole; 4,4'-Bis-(2-butyloctyloxy)-p-quaterphenyl; p-Bis(o-methylstyryl)-benzene; 5,9-Diaminobenzo(a)phenoxazonium Perchlorate; 4-Dicyanomethylene-2-methyl-6-(p-dimethylaminostyryl)-4H-pyran; 1,1'-Diethyl-2,2'-carbocyanine Iodide; 1,1'-Diethyl-4,4'-carbocyanine Iodide; 3,3'-Diethyl-4,4',5,5'-dibenzothiatricarbocyanine Iodide; 1,1'-Diethyl-4,4'-dicarbocyanine Iodide; 1,1'-Diethyl-2,2'-dicarbocyanine Iodide; 3,3'-Diethyl-9,11-neopentylenethiatricarbocyanine Iodide; 1,3'-Diethyl-4,2'-quinolyloxacarbocyanine Iodide; 1,3'-Diethyl-4,2'-quinolylthiacarbocyanine Iodide; 3-Diethylamino-7-diethyliminophenoxazonium Perchlorate; 7-Diethylamino-4-methylcoumarin; 7-Diethylamino-4-trifluoromethylcoumarin; 7-Diethylaminocoumarin; 3,3'-Diethyloxadicarbocyanine Iodide; 3,3'-Diethylthiacarbocyanine Iodide; 3,3'-Diethylthiadicarbocyanine Iodide; 3,3'-Diethylthiatricarbocyanine Iodide; 4,6-Dimethyl-7-ethylaminocoumarin; 2,2'-Dimethyl-p-quaterphenyl; 2,2-Dimethyl-p-terphenyl; 7-Dimethylamino-1-methyl-4-methoxy-8-azaquinolone-2; 7-Dimethylamino-4-methylquinolone-2; 7-Dimethylamino-4-trifluoromethylcoumarin; 2-(4-(4-Dimethylaminophenyl)-1,3-butadienyl)-3-ethylbenzothiazolium Perchlorate; 2-(6-(p-Dimethylaminophenyl)-2,4-neopentylene-1,3,5-hexatrienyl)-3-methylbenzothiazolium Perchlorate; 2-(4-(p-Dimethylaminophenyl)-1,3-butadienyl)-1,3,3-trimethyl-3H-indolium Perchlorate; 3,3'-Dimethyloxatricarbocyanine Iodide; 2,5-Diphenylfuran; 2,5-Diphenyloxazole; 4,4'-Diphenylstilbene; 1-Ethyl-4-(4-(p-Dimethylaminophenyl)-1,3-butadienyl)-pyridinium Perchlorate; 1-Ethyl-2-(4-(p-Dimethylaminophenyl)-1,3-butadienyl)-pyridinium Perchlorate 1-Ethyl-4-(4-(p-Dimethylaminophenyl)-1,3-butadienyl)-quinolium Perchlorate; 3-Ethylamino-7-ethylimino-2,8-dimethylphenoxazin-5-ium Perchlorate; 9-Ethylamino-5-ethylamino-10-methyl-5H-benzo(a) phenoxazonium Perchlorate; 7-Ethylamino-6-methyl-4-trifluoromethylcoumarin; 7-Ethylamino-4-trifluoromethylcoumarin; 1,1',3,3,3',3'-Hexamethyl-4,4',5,5'-dibenzo-2,2'-indotricarboccyanine Iodide; 1,1',3,3,3',3'-Hexamethylindodicarbocyanine Iodide; 1,1',3,3,3',3'-Hexamethylindotricarbocyanine Iodide; 2-Methyl-5-t-butyl-p-quaterphenyl; N-Methyl-4-trifluoromethylpiperidino-<3,2-g>coumarin; 3-(2'-N-Methylbenzimidazolyl)-7-N,N-diethylaminocoumarin; 2-(1-Naphthyl)-5-phenyloxazole; 2,2'-p-Phenylen-bis(5-phenyloxazole); 3,5,3'''',5''''-Tetra-t-butyl-p-sexiphenyl; 3,5,3'''',5''''-Tetra-t-butyl-p-quinquephenyl; 2,3,5,6-1H,4H-Tetrahydro-9-acetylquinolizino-<9,9a,1-gh>coumarin; 2,3,5,6-1H,4H-Tetrahydro-9-carboethoxyquinolizino-<9,9a,1-gh>coumarin; 2,3,5,6-1H,4H-Tetrahydro-8-methylquinolizino-<9,9a,1-gh>coumarin; 2,3,5,6-1H,4H-Tetrahydro-9-(3-pyridyl)-quinolizino-<9,9a,1-gh>coumarin; 2,3,5,6-1H,4H-Tetrahydro-8-trifluoromethylquinolizino-<9,9a,1-gh>coumarin; 2,3,5,6-1H,4H-Tetrahydroquinolizino-<9,9a,1-gh>coumarin; 3,3',2'',3'''-Tetramethyl-p-quaterphenyl; 2,5,2'''',5''''-Tetramethyl-p-quinquephenyl; P-terphenyl; P-quaterphenyl; Nile Red; Rhodamine 700; Oxazine 750; Rhodamine 800; IR 125; IR 144; IR 140; IR 132; IR 26; IR 5; Diphenylhexatriene; Diphenylbutadiene; Tetraphenylbutadiene; Naphthalene; Anthracene; 9,10-diphenylanthracene; Pyrene; Chrysene; Rubrene; Coronene; Phenanthrene; Fluorene; Aluminum phthalocyanine;

Alternatively, a chemically sensitive luminophore (fluorescent or phosphorescent dye) or calorimetric dye is embedded into the transparent or opaque substrate material. Upon testing of the coating applied onto the substrate, if cracks are formed in the coating, they make the substrate more accessible to the environment otherwise protected by the coating. The combination of the chemically sensitive dye and environment are selected to flag the formation of cracks with higher contrast compared to the use of non-chemically sensitive reagents. For example, the reagent in the substrate can be sensitive to oxygen partial pressure and the coating deposition can be performed in air. If testing is performed in nitrogen, then the depth-resolved crack formation is monitored in real time by observing the increase in luminescence intensity or luminescence lifetime upon formation of the crack as it reaches the substrate. Alternative reagents may be sensitive to other factors, such as moisture or water vapor.

One class of reagents includes porphyrins. Examples of suitable porphyrins include but are not limited to tetraphenylporphyrin, metal porphyrins, such as platinum (II) octaethylporphyrin (Pt-OEP) and palladium(II) octaethylporphyrin (Pd-OEP), and others as described in P. Hartmann, W. Trettnak, "Effects of polymer matrices on calibration functions of luminescent oxygen sensors based on porphyrin ketone complexes," Anal. Chem. 1996, 68, 2615–2620; A. Mills, A. Lepre, "Controlling the response characteristics of luminescent porphyrin plastic film sensors for oxygen," Anal Chem. 1997, 69, 4653–4659; Potyrailo, R. A.; Hieftje, G. M., Oxygen detection by fluorescence quenching of tetraphenylporphyrin immobilized in the original cladding of an optical fiber, Anal Chim. Acta 1998, 370, 1–8.

Another class of reagents includes polycyclic aromatic hydrocarbons. Examples and applications of this class of fluorophores are described by: I. B. Berlman, Handbook of luminescence spectra of aromatic molecules, Academic Press, New York, N.Y., 1971; O. S. Wolfbeis, Fiber Optic Chemical Sensors and Biosensors; O. S. Wolfbeis, Ed.; CRC Press: Boca Raton, Fla., 1991; Vol. 2; pp 19–53; Hobbs, S. E.; Potyrailo, R. A.; Hieftje, G. M., Scintillator light source for chemical sensing in the near-ultraviolet, Anal. Chem. 1997, 69, 3375–3379. Preferred fluorophores of this class include pyrene, pyrenebutyric acid, fluoranthene, decacyclene, diphenylanthracene, and benzo (g,h,l)perylene.

Another class of reagents includes a variety of long-wave absorbing dyes such as perylene dibutyrate, and heterocycles including fluorescent yellow, trypaflavin and other heterocycle compounds as described by: O. S. Wolfbeis, Fiber Optic Chemical Sensors and Biosensors; O. S. Wolfbeis, Ed.; CRC Press: Boca Raton, Fla., 1991; Vol. 2; pp 19–53.

Yet another group of reagents includes metal-organic complexes of ruthenium, osmium, iridium, gold and platinum as described by: O. S. Wolfbeis, Fiber Optic Chemical Sensors and Biosensors; O. S. Wolfbeis, Ed.; CRC Press: Boca Raton, Fla., 1991; Vol. 2; pp 19–53, J. N. Demas, B. A. Degraff, P. B. Coleman, "Oxygen sensors based on luminescence quenching," Anal. Chem. 1999, 71, 793A–800A; J. N. Demas, B. A. DeGraff, "Design and applications of highly luminescent transition metal complexes," Anal. Chem. 1991, 63, 829A–837A; A. Mills, A. Lepre, B. R. Theobald, E. Slade, B. A. Murrer, "Use of luminescent gold compounds in the design of thin-film oxygen sensors," Anal. Chem. 1997, 69, 2842–2847; Potyrailo, R. A.; Hieftje, G. M., Use of the original silicone cladding of an optical fiber as a reagent-immobilization medium for intrinsic chemical sensors, Fresenius' J. Anal. Chem. 1999, 364, 32–40.

Yet another group of reagents includes solvatochromic dyes as extensively reviewed in, for example, C. Reichardt, Chemical Reviews, volume 94, pages 2319–2358 (1994); C. Reichardt, S. Asharin-Fard, A. Blum, M. Eschner, A. M. Mehranpour, P. Milart, T. Nein, G. Schaefer, and M. Wilk, Pure and Applied Chemistry, volume 65, no. 12, pages 2593–601 (1993); E. Buncel and S. Rajagopal, Accounts of Chemical Research, volume 23, no. 7, pages 226–31 (1990); and C. Reichardt, "Solvents and Solvent Effects in Organic Chemistry, 2 Ed.", VCH Publishers: Weinheim, 1988. Preferred fluorescent solvatochromic dyes have a luminescence quantum yield of greater than about 0.01. Other characteristics of the dyes include positive and negative solvatochromism which corresponds to the bathochromic and hypsochromic shifts, respectively of the emission band with increasing solvent polarity. In addition to the solvent-induced spectral shifts of the emission spectra, some dyes exhibit the solvent-dependent ratio of emission intensities of two luminescence bands. One such solvatochromic dye is pyrene. Some examples of preferred solvatochromic dyes include 4-dicyanmethylene-2-methyl-6-(p-dimethylaminostyryl)-4H-pyran (DCM; CAS Registry No. 51325-91-8); 6-propionyl-2-(dimethylamino)naphthalene (PRODAN; CAS Registry No. 70504-01-7); 9-(diethylamino)-5H-benzo[a]phenoxazin-5-one (Nile Red; CAS Registry No. 7385-67-3); phenol blue; stilbazolium dyes; coumarin dyes; ketocyanine dyes, including CAS Registry No. 63285-01-8; Reichardt's dyes including Reichardt's Betaine dye (2,6-diphenyl-4-(2,4,6-triphenylpyridinio)phenolate; CAS Registry No.10081-39-7); merocyanine dyes, including merocyanine 540 (CAS Registry No. 62796-23-0); so-called TT * dyes, including N,N-dimethyl-4-nitroaniline (NDMNA; CAS Registry No.100-23-2) and N-methyl-2-nitroaniline (NM2NA; CAS Registry No. 612-28-2); and the like. Applications of solvatochromic dyes for monitoring of moisture are described for example in Sadaoka, Y.; Matsuguchi, M.; Sakai, Y.; Murata, Y.-U., Optical humidity sensor using Reichardt's betain dye-polymer composites, Chem. Lett. 1992, 53–56; Sadaoka, Y.; Sakai, Y.; Murata, Y., Optical humidity and ammonia gas sensors using Reichardt's dye-polymer composites, Talanta 1992, 39, 1675–1679; Potyrailo, R. A.; Hieftje, G. M., Use of the original silicone cladding of an optical fiber as a reagent-immobilization medium for intrinsic chemical sensors, Fresenius' J. Anal. Chem. 1999, 364, 32–40.

Yet another group of reagents includes colorimetric and luminescent acid-base and cationic reagents as extensively reviewed in, for example, Kolthoff, I. M. Acid-Base Indicators; The MacMillan Company: New York, 1937; Bacci, M.; Baldini, F.; Bracci, S., Spectroscopic behavior of acid-base indicators after immobilization on glass supports, Appi. Spectrosc. 1991, 45, 1508–1515; Sadaoka, Y.; Matsuguchi, M.; Sakai, Y.; Murata, Y.-U., Optical humidity sensing characteristics of Nafion-dyes composite thin films, Sens. Actuators B 1992, 7, 443–446; Sadaoka, Y.; Sakai, Y.; Murata, Y., Optical properties of cresyl violet-polymer composites for quantification of humidity and ammonia gas in ambient air, J. Mater. Chem. 1993, 3, 247–251; Zinger, B.; Shier, P., Spectroscopic studies of cationic dyes in Nafion, Preliminary investigation of a new sensor for hydrophilic contamination in organic solvents, Sens. Actuators B 1999, 56, 206–214; Haugland, R. P. Handbook of Fluorescent Probes and Research Chemicals; Molecular Probes: Eugene, Oreg., 1996. Some of these dyes are thymol blue, congo red, methyl orange, bromocresol green, methyl red, bromocresol purple, bromothymol blue, cresol red, phenolphthalein, SNAFL indicators, SNARF indicators, 8-hydroxypyrene-1, 3,6-trisulfonic acid, fluorescein and its derivatives, oregon green, and a variety of dyes mostly used as laser dyes including rhodamine dyes, styryl dyes, cyanine dyes, and a large variety of other dyes. These reagents may also be referred to as pH reagents.

Yet another group of reagents includes oxygen-sensitive calorimetric reagents. Some reagents useful for calorimetric determinations of molecular oxygen are reviewed in Chemical Detection of Gaseous Pollutants; Ruch, W. E., Ed.; Ann Arbor Science Publishers: Ann Arbor, Mich., 1968. These include, among others, 2,4-diaminophenol dihydrochloride, manganous oxide, combination of manganous hydroxide and potassium iodide containing starch, ferrous salt in combination with methylene blue, reduced form of sodium anthraquinone-B-sulfonate, reduced form of ammonium anthraquinone-2-sulfonate, carbohydrate of Tschitschibabin, alkaline pyrogallol, and ammoniacal cuprous chloride.

Yet another group of reagents includes oxygen-sensitive chemoluminescent reagents. Some reagents useful for chemoluminescent determinations of molecular oxygen are reviewed in: O. S. Wolfbeis, Fiber Optic Chemical Sensors and Biosensors; O. S. Wolfbeis, Ed.; CRC Press: Boca Raton, Fla., 1991; Vol. 2; pp 19–53. Among others, useful chemoluminescent compounds for oxygen determinations are poly(ethylene-2,6-naphthalene-dicarboxylate), tetraamino-ethylenes without aromatic functions, and many others.

Additional fluorophores which are suitable for use in the methods of the present invention include Lumogen F (available from BASF, Inc.), Yellow dye 083, Red dye 300, Orange dye 240 and Violet dye 570.

The elongation of each coating 16 is typically measured before and after the coating is tested. The elongation of each coating 16 is measured after the coating is tested relative to the initial coating condition. The elongation may be calculated in units of extensibility or in percent elongation. For example, a prescreen coating measurement of 5 mm and a post-test coating measurement of 10 mm demonstrates 100% elongation.

In an alternative embodiment of the present invention, a system 42 for testing coatings comprises substrates 12 made of a deformable material. This particular embodiment is illustrated in FIGS. 9–12. Any deformable material may be used such that prior to applying a force to the deformable material the material has a first shape, and after a force is applied to the material, the material exhibits and maintains a second shape. It is important for the substrate 12 to comprise a sufficient thickness so that the deformation force applied to the substrate does not induce the formation of cracks or other defects in the substrate 12. Suitable deformable materials include, but are not limited to poly(ethylene) terepthalate, polycarbonate, polyvinylchloride, or blends thereof. Preferably, the deformable material is polycarbonate The substrates 12 are preferably in the form of a sphere, semisphere, cylinder or geometrical shape having a curved surface.

As illustrated, an array of substrates 12 are secured in a test arrangement and a plurality of coatings 16 are deposited onto the substrates. Several distinct coatings 16 may be applied to different substrates 12. Alternatively, coatings 16 comprising the same composition may be applied to a plurality of substrates 12. In addition, coatings 16 comprising a gradient in composition, thickness or other parameter, may be applied to the plurality of substrates 12. The coatings 16 may be cured after they are deposited onto the substrates 12 using any method known in the art. The coatings 16 are prescreened for any cracks, and a pre-test elongation measurement is taken of each coating.

A force is then applied to each substrate 12 wherein the force modifies the shape of the substrate, thereby causing the coating 16 on the substrate to bend. The force may be a compressive force, and may be applied in a lateral direction on opposite sides of each substrate 12. The elongating force applied to the substrates 12 is typically in a direction normal to the surface of each substrate, and results in a reduction in the curvature of the substrates.

A detection system 22 as described above is then used to visualize any cracks formed in the coatings 16 and/or decrease in coating thickness after the coatings are tested. In addition, an elongation measurement of each coating 16 is taken after the coatings are tested.

Figure 13:
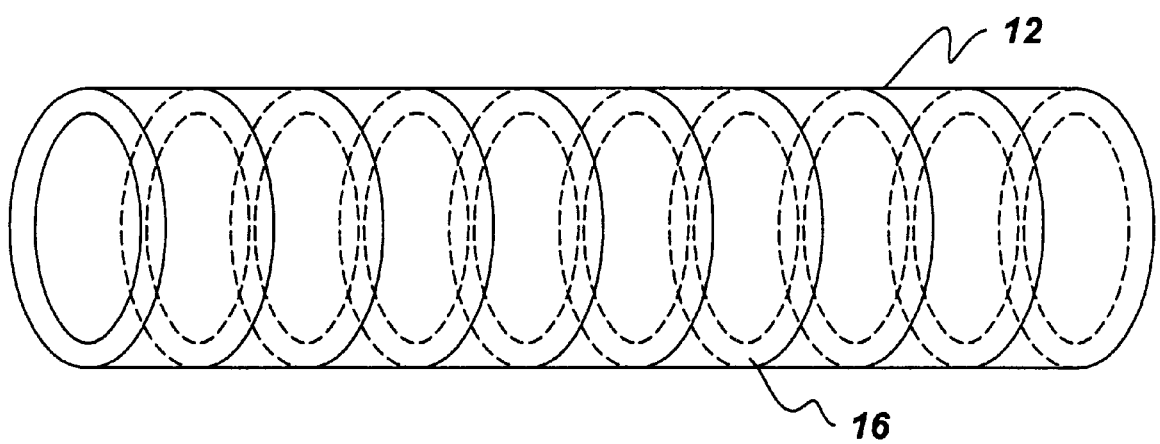
FIG. 13 is a perspective view of an alternative embodiment of the present invention.

FIG. 13 illustrates another embodiment of the present invention. This embodiment comprises applying at least one coating 16 onto a substrate 12. Preferably, a plurality of coatings 16 are deposited onto the substrate 12 in an array format. As shown in FIG. 13, the coatings 16 may be adjacently disposed lengthwise on the substrate 12. Alternatively, one or more coatings may be applied to the substrate 12 in a gradient format. If necessary, the coatings 16 are cured using any method known to those having skill in the art. The coatings 16 are prescreened for any cracks, and a pre-test elongation measurement is taken of each coating.

The substrate 12, preferably has a cylindrical cross-sectional geometry. However, the cross section of the substrate 12, may be any geometrical shape including, but not limited to slab or rectangular shapes. The substrate 12, may be made of various materials including, but not limited to quartz, polymers, silica, silicone or other types of dielectric materials. Furthermore, the substrate 12, is preferably a waveguide such as an optical fiber (see Table 1). The substrate 12 is then formed into at least one coil having a particular diameter.

| Supplier | Fiber core material (and diameters in microns) | Fiber cladding materials (and diameters in microns) |
| --- | --- | --- |
| Polymicro Technologies, Inc., Phoenix, AZ | silica (125, 200, 400, 500, 700) | hard polymer (140, 220, 420, 520, 740) |
| | silica (300, 400, 600, 800) | silicone (450, 500, 700, 900) |
| Fiberguide Industries, Inc., Stirling, NJ | silica (200, 300, 400, 600, 800, 1000, 1500, 2000) | silicone (300, 400, 500, 700, 900, 1100, 1650, 2150) |
| 3M Specialty Fibers, West Haven, CT | silica (125, 200, 300, 400, 600, 800, 1000, 1500) | hard polymer (140, 230, 330, 430, 630, 830, 1035, 1550) |
| | silica (200, 400, 600, 1000) | silicone (380, 600, 830, 1400) |
| Toray Industries, Inc., Chiba, Japan | polymethyl methacrylate | fluorinated polymer (250, 500, 750, 1000, 1500, 2000, 3000) |
| Asahi Kasei Corp., Japan | polymethyl methacrylate | hard polymer |
| Sentel Technologies, L. L. C., Pullman, WA | polymethyl methacrylate/polystyrene | polymethyl methacrylate |

A detection system 22 as previously described is then used to automatically visualize any cracks formed in the coatings 16 and/or decrease in coating thickness after the substrate 12 is formed into the coil. In addition, an elongation measurement of each coating 16 is taken.

The next step involves coiling of the coating library 16 using a smaller coil diameter. The substrate 12 is formed into at least one successive coil wherein the diameter of the successive coil is less than the diameter of the preceding coil. After the formation of each successive coil in the substrate 12, the coatings 16 are monitored for cracks using the detection system 22, and an elongation measurement of each coating 16 is taken. This step is repeated until all of the coating 16 regions demonstrate crack formation or until a predetermined level of elongation is reached. Such predetermined level of elongation can be provided by observing performance of a reference coating.

Figure 14:
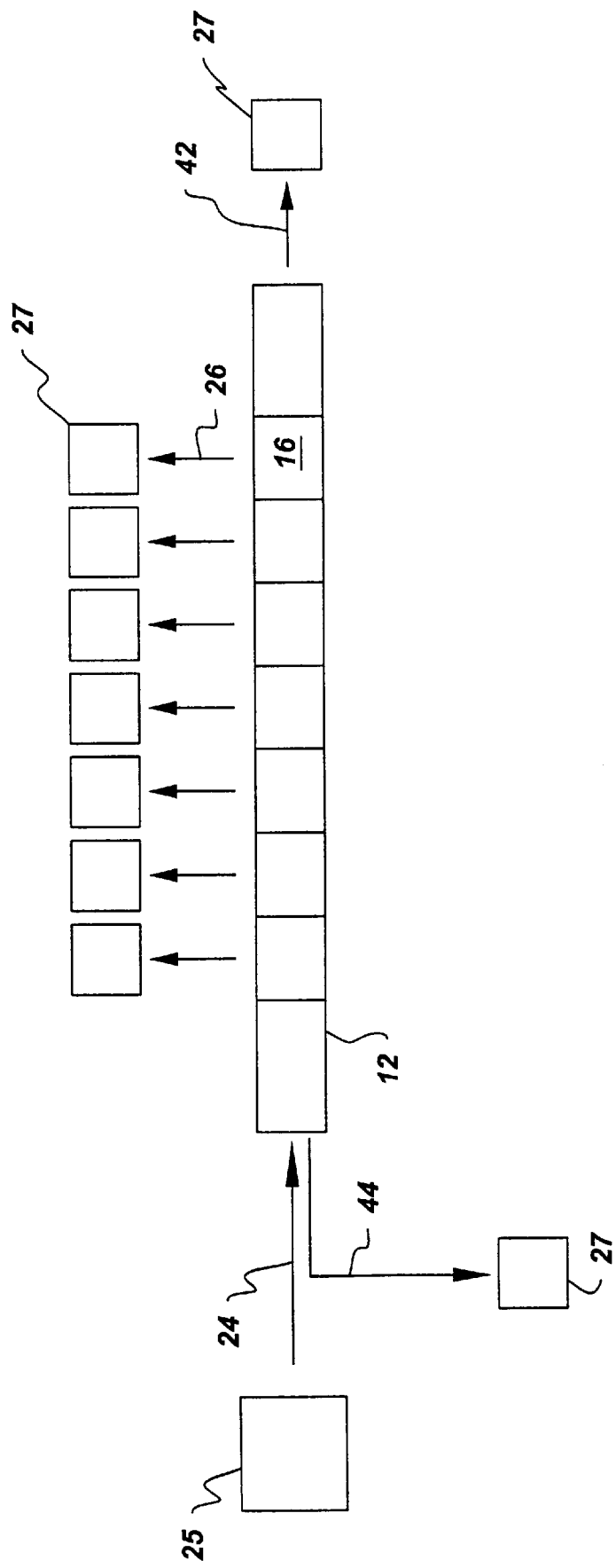
FIG. 14 is a perspective view of an alternative embodiment of the present invention.

FIG. 14 depicts an alternative system for monitoring the cracks in the coatings 16. A single light source 25 is used to direct excitation light 24 into one end of the substrate 12. Before, during and after the test, a plurality of detectors 27, such as imaging detectors, are used to measure the scattered light 26 produced from the coatings 16. Preferably, the scattered light 26 of each coating 16 is measured by a separate corresponding detector 27. The amount of scattered light 26 is directly proportional to the number of defects, including cracks, in the coatings 16. Alternatively, the excitation light 24 directed into the substrate 12 is collected as transmitted light 42 at the opposite end of the substrate with a single detector 27. The amount of transmitted light 42 is inversely proportional to the number of defects in the coatings 16. Furthermore, back-propagated light 44 may be collected with a detector 27, wherein the amount of back-propagated light 44 is directly proportional to the number of defects in the coatings 16. It should be understood that the following items may remain constant or be varied in any test performed using the methods of the present invention: composition of coatings; thickness of coatings; number of coating deposits on a substrate; number of substrates used; and composition of substrates.

It is apparent that there have been provided in accordance with this invention, methods of elongation and cracking testing for coatings. While the invention has been particularly shown and described in conjunction with preferred embodiments thereof, it will be appreciated that variations and modifications can be effected by a person of ordinary skill in the art without departing from the scope of the invention.

What is claimed is:

1. A method for testing coatings, comprising:
    simultaneously applying an elongation in three dimensions by bending to each of a plurality of coatings;
    monitoring for cracks in each of the plurality of coatings; and
    determining a relative performance characteristic of each of the plurality of coatings based on a correlation between a detected crack in the coating or a decrease in thickness of the coating, and the corresponding elongation in three dimensions by bending;
    wherein the cracks are monitored with a detection system and the detection system comprises;
        immersing the plurality of coatings in a luminophore solution;
        directing light toward each coating; and
        detecting luminescent light from the luminophore located in any cracks in each coating.

2. The method of claim 1, wherein a portion of the plurality of coatings have different compositions.

3. The method of claim 1, wherein each of the plurality of coatings is disposed on a substantially flat substrate, and wherein simultaneously applying the elongation in three dimensions by bending comprises relatively translating opposing ends of each of the plurality of coatings in opposite directions.

4. The method of claim 3, wherein relatively translating opposing ends of each of the plurality of coatings further comprises immobilizing one of the opposing ends of each of the plurality of coatings.

5. The method of claim 1, wherein each of the plurality of coatings is disposed on a substantially curved substrate, and wherein simultaneously applying the elongation in three dimensions by bending comprises reducing the curvature of the curved substrate.

6. The method of claim 1, wherein each of the plurality of coatings is disposed on a substantially curved substrate, and wherein simultaneously applying the elongation in three dimensions by bending comprises increasing the curvature of the curved substrate.

7. The method of claim 6, wherein reducing the curvature of the curved surface comprises applying the elongation in three dimensions by bending in a direction normal to the surface of the curved substrate.

8. The method of claim 1, wherein each of the plurality of coatings are adjacently disposed lengthwise on a single substrate, and wherein simultaneously applying the elongation in three dimensions by bending further comprises forming the substrate into a coil.

9. The method of claim 1, further comprising exposing the coatings to test conditions such as temperature, time, electromagnetic radiation, ionizing radiation, ultraviolet light, moisture, salt spray, partial pressure of different gases, or varying compositions of gas or liquid in contact with the coatings.

10. The method of claim 1, wherein the size of each coating is from about 0.001 cm$^2$ to about 100 cm$^2$.

11. The method of claim 1, wherein the coatings comprise oxides, nitrides and oxinitrides of silicon, aluminum, zinc and boron, polyvinyl alcohol, ethylene vinyl alcohol copolymers, polyvinyl dichloride, nylon, acrylic, melamine, urethane, polyester, polyether, silicone, cellophane, sol-gel, polyethylene terepthalate, polyvinylchloride, polychlorotrifluoroethylene (PCTFE), polypropylene, latexes, aminoplast resins, polyurethanes, epoxies, phenolic resins, acrylic resins, polyester resins, alkyd resins, halogenated polymers, cellulose derivative polymers, unsaturated polyester resins, (meth)acrylated oligomers, organic silicon derivative polymers or combinations thereof.

12. The method of claim 1, wherein each coating comprises a luminescent or calorimetric reagent.

13. The method of claim 12, further comprising a detection system which comprises:
    directing light toward each coating; and
    detecting luminescent or colored light from the reagent in the coating.

14. The method of claim 1, wherein the substrate comprises a luminescent or calorimetric reagent.

15. The method of claim 14, further comprising a detection system which comprises:
    directing light toward each coating; and
    detecting luminescent or colored light from the reagent in the substrate.

16. A method for testing coatings, comprising:
    applying a plurality of coatings to a plurality of substrates wherein each coating is applied to a different substrate;
    securing the substrates in a test arrangement;
    applying a force to the substrates in order to bend the coating on each substrate; and
    using a detection system to visualize cracks in each coating or a decrease in thickness of each coating;
    wherein the detection system comprises:
    directing light toward each coating; and
    detecting scattered light from any cracks in each coating.

17. The method of claim 16, wherein the test arrangement is in the form of an array.

18. The method of claim 16, wherein the coatings comprise oxides, nitrides and oxinitrides of silicon, aluminum, zinc and boron, polyvinyl alcohol, ethylene vinyl alcohol copolymers, polyvinyl dichloride, nylon, acrylic, melamine, urethane, polyester, polyether, silicone, cellophane, sol-gel, polyethylene terepthalate, polyvinylchloride, polychlorotrifluoroethylene (PCTFE), polypropylene, latexes, aminoplast resins, polyurethanes, epoxies, phenolic resins, acrylic resins, polyester resins, alkyd resins, halogenated polymers, cellulose derivative polymers, unsaturated polyester resins, (meth)acrylated oligomers, organic silicon derivative polymers or combinations thereof.

19. The method of claim 16, wherein the size of each coating is from about 0.001 cm$^2$ to about 100 cm$^2$.

20. The method of claim 16, wherein a force is applied to the substrates by relatively translating opposing ends of each substrate in opposite directions.

21. The method of claim 20, wherein one end of each substrate is secured to a base.

22. The method of claim 21, further comprising securing the opposite end of each substrate.

23. The method of claim 16, wherein the detection system comprises:
   immersing the substrates in a luminophore solution;
   directing light toward each coating; and
   detecting luminescent light from the luminophore located in any cracks in each coating.

24. The method of claim 16, wherein each coating comprises a luminescent or colorimetric reagent.

25. The method of claim 24, wherein the detection system comprises:
   directing light toward each coating; and
   detecting luminescent or colored light from the reagent in the coating.

26. The method of claim 16, wherein the substrate comprises a luminescent or calorimetric reagent.

27. The method of claim 26, wherein the detection system comprises:
   directing light toward each coating; and
   detecting luminescent or colored light from the reagent in the substrate.

28. The method of claim 16, further comprising measuring an elongation of each coating after the force is applied to the substrates.

29. The method of claim 16, wherein the substrate comprises poly(ethylene) terepthalate, polycarbonate, polyacrylate, polyvinylchloride, nylon, poly (butylenes terephthalate), polypropylene, polyethylene, or blends thereof.

30. The method of claim 16, wherein the substrate comprises polycarbonate.

31. The method of claim 16, further comprising pre-screening each coating prior to applying a force to the substrates.

32. The method of claim 31, wherein the substrate comprises poly(ethylene) terepthalate, polycarbonate, polyacrylate, polyvinylchloride, nylon, poly (butylenes terephthalate), polypropylene, polyethylene, or blends thereof.

33. The method of claim 31, wherein a force is applied to the substrates by relatively translating opposing ends of each substrate in opposite directions.

34. The method of claim 33, wherein one end of each substrate is secured to a first base, and applying a force to the substrates comprises moving the base in a lateral direction.

35. The method of claim 34, further comprising securing the opposite end of each substrate within a slot located on a second base.

36. The method of claim 31, wherein the coatings comprise oxides, nitrides and oxinitrides of silicon, aluminum, zinc and boron, polyvinyl alcohol, ethylene vinyl alcohol copolymers, polyvinyl dichloride, nylon, acrylic, melamine, urethane, polyester, polyether, silicone, cellophane, sol-gel, polyethylene terepthalate, polyvinylchloride, polychlorotrifluoroethylene (PCTFE), polypropylene, latexes, aminoplast resins, polyurethanes, epoxies, phenolic resins, acrylic resins, polyester resins, alkyd resins, halogenated polymers, cellulose derivative polymers, unsaturated polyester resins, (meth)acrylated oligomers, organic silicon derivative polymers or combinations thereof.

37. The method of claim 36, wherein the detection system comprises:
   directing light toward each coating; and
   detecting scattered light from any cracks in each coating.

38. The method of claim 36, wherein the detection system comprises:
   immersing the substrates in a luminophore solution;
   directing light toward each coating; and
   detecting luminescent light from the luminophore located in any cracks in each coating.

39. The method of claim 36, wherein each coating comprises a luminescent or calorimetric reagent.

40. The method of claim 39, wherein the detection system comprises:
   directing light toward each coating; and
   detecting luminescent or colored light from the reagent in the coating.

41. The method of claim 36, wherein the substrate comprises a luminescent or colorimetric reagent.

42. The method of claim 41, wherein the detection system comprises:
   directing light toward each coating; and
   detecting luminescent or colored light from the reagent in the substrate.

43. The method of claim 36, further comprising measuring an elongation of each coating after the force is applied to the substrates.

44. The method of claim 36, wherein the size of each coating is from about 0.001 $cm^2$ to about 100 $cm^2$.

45. The method of claim 16, wherein the substrates are made of a deformable material.

46. The method of claim 45, wherein the deformable material comprises poly (ethylene)terepthalate, polycarbonate, polyacrylate, polyvinylchloride, nylon, poly (butylenes terephthalate), polypropylene, polyethylene, or blends thereof.

47. The method of claim 45, wherein the coatings comprise oxides, nitrides and oxinitrides of silicon, aluminum, zinc and boron, polyvinyl alcohol, ethylene vinyl alcohol copolymers, polyvinyl dichloride, nylon, acrylic, melamine, urethane, polyester, polyether, silicone, cellophane, sol-gel, polyethylene terepthalate, polyvinylchloride, polychlorotrifluoroethylene (PCTFE), polypropylene, latexes, aminoplast resins, polyurethanes, epoxies, phenolic resins, acrylic resins, polyester resins, alkyd resins, halogenated polymers, cellulose derivative polymers, unsaturated polyester resins, (meth)acrylated oligomers, organic silicon derivative polymers or combinations thereof.

48. The method of claim 45, wherein the size of each coating is from about 0.001 $cm^2$ to about 100 $cm^2$.

49. The-method of claim 45, further comprising pre-screening each coating prior to applying a force to the substrates.

50. The method of claim 45, wherein the force applied to each substrate modifies the shape of the substrate, thereby causing the coating on the substrate to bend.

51. The method of claim 45, wherein the substrates are in the form of a sphere, semisphere, cylinder or geometrical shape having a curved surface.

52. The method of claim 51, wherein the force is applied in a lateral direction on opposite sides of each substrate.

53. The method of claim 51, wherein the force applied to each substrate is applied in a direction normal to the surface of the substrate.

54. The method of claim 53, wherein applying a force to the substrates comprises reducing the curved surface of each substrate.

55. The method of claim 45, wherein the detection system comprises:

directing light toward each coating; and detecting scattered light from any cracks in each coating.

56. The method of claim 45, wherein the detection system comprises:

immersing the substrates in a luminophore solution;

directing light toward each coating; and detecting luminescent light from the luminophore located in any cracks in each coating.

57. The method of claim 45, wherein each coating comprises a luminescent or colorimetric reagent.

58. The method of claim 57, wherein the detection system comprises:

directing light toward each coating; and detecting luminescent or colored light from the reagent in the coating.

59. The method of claim 45, wherein the substrate comprises a luminescent or calorimetric reagent.

60. The method of claim 59, wherein the detection system comprises:

directing light toward each coating; and detecting luminescent or colored light from the reagent in the substrate.

61. The method of claim 45, further comprising measuring an elongation of each coating after the force is applied to the substrates.

62. A method for testing coatings comprising:

applying at least one coating to a substrate;

forming the substrate into at least one coil having a first diameter; and using a detection system to visualize cracks in each coating or a decrease in thickness of each coating.

63. The method of claim 62, further comprising:

forming the substrate into at least one successive coil, wherein the diameter of the successive coil is less than the diameter of a preceding coil; and using a detection system to visualize cracks in each coating or a decrease in thickness of each coating caused by the successive set of multiple coils.

64. The method of claim 63, wherein the substrate is formed into successive coils until each coating on the substrate contains at least one crack.

65. The method of claim 63, further comprising measuring the elongation of each coating after the substrate is formed into a successive coil.

66. The method of claim 62, wherein the coating comprises oxides, nitrides and oxinitrides of silicon, aluminum, zinc and boron, polyvinyl alcohol, ethylene vinyl alcohol copolymers, polyvinyl dichloride, nylon, acrylic, melamine, urethane, polyester, polyether, silicone, cellophane, sol-gel, polyethylene terepthalate, polyvinylchloride, polychlorotrifluoroethylene (PCTFE), polypropylene, latexes, aminoplast resins, polyurethanes, epoxies, phenolic resins, acrylic resins, polyester resins, alkyd resins, halogenated polymers, cellulose derivative polymers, unsaturated polyester resins, (meth)acrylated oligomers, organic silicon derivative polymers or combinations thereof.

67. The method of claim 62, wherein a coating is applied to the substrate in a gradient format.

68. The method of claim 62, wherein a plurality of coatings are applied to the substrate in an array format.

69. The method of claim 62, wherein the size of each coating is from about 0.001 $cm^2$ to about 100 $cm^2$.

70. The method of claim 62, wherein the plurality of coatings are adjacently disposed lengthwise on the substrate.

71. The method of claim 62, wherein the substrate comprises quartz, a polymer, silica, silicone, or other dielectric materials.

72. The method of claim 62, wherein the cross section of the substrate is in the shape of a cylinder or rectangle.

73. The method of claim 62, wherein the substrate is a waveguide.

74. The method of claim 73, wherein the substrate is an optical fiber.

75. The method of claim 62, further comprising pre-screening each coating prior to forming the substrate into a coil.

76. The method of claim 62, wherein the detection system comprises:

directing light toward each coating; and detecting-scattered light from any cracks in each coating.

77. The method of claim 62, wherein the detection system comprises:

immersing the coiled substrate into a luminophore solution;

directing light toward each coating; and detecting luminescent light from the luminophore located in any cracks in each coating.

78. The method of claim 62, wherein each coating comprises a luminescent or colorimetric reagent.

79. The method of claim 78, wherein the detection system comprises:

directing light toward each coating; and detecting luminescent or colored light from the reagent in the coating.

80. The method of claim 62, wherein the substrate comprises a luminescent or colorimetric reagent.

81. The method of claim 62, further comprising measuring an elongation of each coating after the coating is formed into a coil.

* * * * *